United States Patent

[11] 3,578,271

[72] Inventor Charles S. Thompson, Jr.
 Vincentown, N.J.
[21] Appl. No. 839,870
[22] Filed July 8, 1969
[45] Patented May 11, 1971
[73] Assignee Gulf & Western Industrial Products
 Company
 Grand Rapids, Mich.

[54] AIRCRAFT ARRESTING DEVICE
 7 Claims, 6 Drawing Figs.
[52] U.S. Cl. .................................................. 244/110,
 242/68
[51] Int. Cl. ..................................................... B64f 1/02
[50] Field of Search ......................................... 244/110;
 242/68, 77, 77.1

[56] References Cited
 FOREIGN PATENTS
 1,384,663 11/1964 France ....................... 244/110

Primary Examiner—Milton Buchler
Assistant Examiner—Paul E. Sauberer
Attorney—Meyer, Tilberry and Body ABSTRACT: An aircraft arresting device includes a rotatable reel having a central axis and a hub on which an elongated flat tape is coiled in layer-by-layer convolutions. The hub has a noncircular cross-sectional shape and includes a plurality of radially extending projections. A tape coiled upon the hub of the reel is under greater compressive force in the area of the projections so that relative slippage between adjacent convolutions of the tape on the reel is prevented.

Patented May 11, 1971 3,578,271

INVENTOR.
CHARLES S. THOMPSON JR.
BY
Meyer, Tilberry & Body
ATTORNEYS

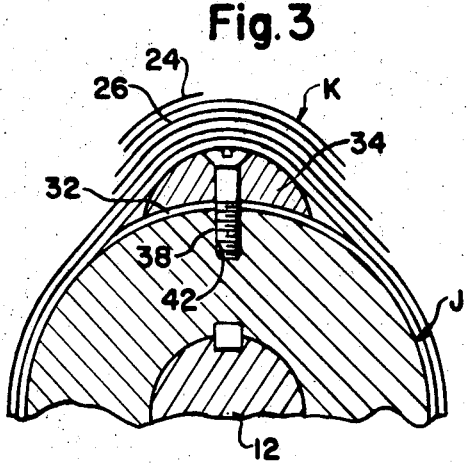
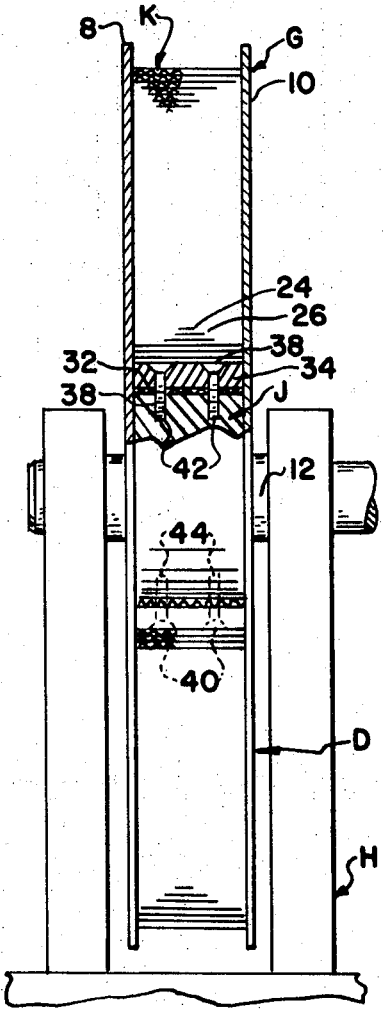
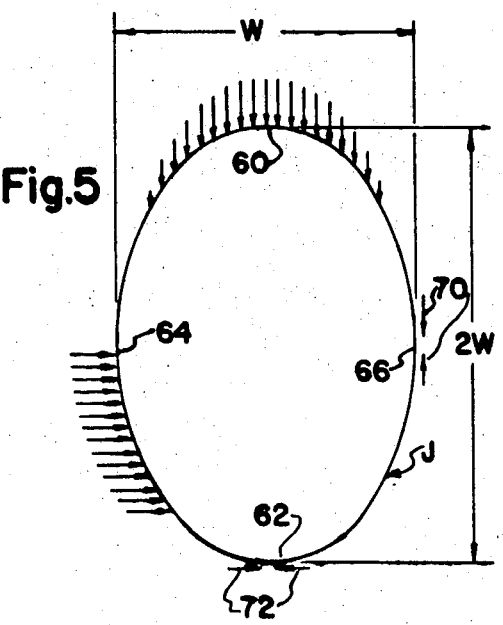
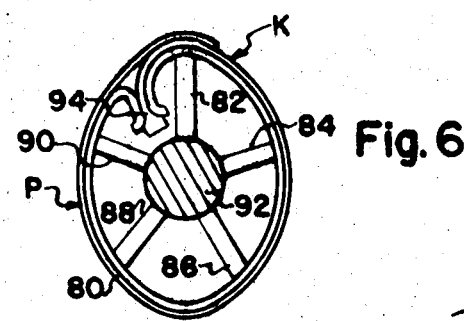
INVENTOR.
CHARLES S. THOMPSON JR.
BY
Meyer, Tilberry & Body
ATTORNEYS

[3,578,271]

AIRCRAFT ARRESTING DEVICE

BACKGROUND OF THE INVENTION

This application pertains to the art of arresting movement of moving bodies and more particularly to arresting moving bodies by means of a device which includes rotatable reel on which an elongated flat tape is wound in layer-by-layer convolutions.

The invention is particularly applicable to devices for arresting landing aircraft and will be described with particular reference thereto, although it will be appreciated that the invention has broader applications and can be used for arresting movement of other bodies.

One prior type of aircraft arresting apparatus includes rotatable reels positioned on opposite sides of an aircraft runway. Elongated flat tapes are coiled in layer-by-layer convolutions upon the reels and the tapes have free ends extending from the reels to points of connection with a steel cable which is stretched across an aircraft runway. An aircraft landing on the runway engages the steel cable and places tension in the tapes to uncoil the tapes from the reels. The reels are braked to retard their rotation and the aircraft is brought to a stop. Such prior apparatus is described in U.S. Pat. Re. Nos. 25,406 and 3,142,458 to Byrne et al. The disclosures in these prior patents are hereby incorporated into the disclosure of this specification.

In prior apparatus of the type described, the tapes are coiled upon the reels with the tapes under substantially less tension than when an aircraft is arrested. That is, the tapes are somewhat loosely wound upon the reels because it is impractical to place as much tension in the tape when rewinding as when an aircraft is arrested. Placing such tension in the tape when rewinding would require an extremely powerful rewind motor. Because the adjacent layers of tape on the reel are rather loose, they can slide relative to one another and the high tension produced in the tape during arrestment of an aircraft often causes the tape convolutions on the reel to tighten much in the manner of a clock spring being wound. When the tape convolutions on the reel tighten during an arrestment, the only force producing a back tension in the tape is a frictional force between adjacent tape layers. This resisting force is much smaller than the braking force applied to the reel and the tension in the tape will momentarily drop off considerably. During this momentary tightening of the tape convolutions on the reel, the aircraft will be under substantially no restraint. Once tightening of the tape convolutions on the reel has been completed, the full braking force of the reel will again be applied to the aircraft through the tape. This produces a severe impact load on the aircraft and the arresting apparatus. Such impact loads are highly undesirable as they may cause failure in the aircraft or in parts of the arresting apparatus. It is most desirable to have a substantially constant retarding force applied to the aircraft until it comes to a stop. Therefore, it is desirable to eliminate slippage of adjacent layers of tape on the reel so that the tape on the reel cannot be tightened merely by pulling on its free end.

One prior arrangement for eliminating tightening of the tape convolutions on the reel in order to reduce momentary slackening of the arresting tape is disclosed in U.S. Pat. No. 3,392,938 to Cruger et al. In this prior arrangement, the flat surfaces of an elongated flat tape are coated with a material having a very low coefficient of friction. That is, the flat surfaces of the tape are very slippery. The theory of this arrangement is to have the tape convolutions tighten on the reel at the initial moment of aircraft arrestment before the reel produces its maximum retarding force and the corresponding maximum back tension in the tape. In such an arrangement, the coating may wear off after a short period of time and become ineffective. In addition, it is still possible to have momentary slack periods in the tape after the initial arrestment when a maximum back tension is produced in the tape.

It would be desirable to have an aircraft arresting apparatus of the type described wherein momentary slackening of the tape during an arrestment was eliminated. It would be desirable to have an apparatus arranged in such a manner that tightening of adjacent layers or convolutions of tape on the reel would be prevented during arrestment of an aircraft.

SUMMARY OF THE INVENTION

In accordance with the present invention, an aircraft arresting device is provided with a rotatable reel having a central axis and a hub on which an elongated flat tape is coiled in layer-by-layer convolutions. In the preferred arrangement, the hub has a noncircular cross-sectional shape in order to provide a concentrated compressive force over a portion of the tape layers on the reel. More specifically, the reel hub includes a plurality of substantially equiangularly spaced projections extending radially of the central axis of the reel. The hub also has portions between adjacent projections which may be termed hub space portions. The outer periphery of the hub is then defined by the projections and the hub space portions. The hub space portions define a substantially greater portion of the outer periphery of the hub than do the projections. The tape convolutions also lie closer to the central axis of the reel at the hub space portions than at the projections. Rewinding of the tape onto the reel under slight tension causes successive outer layers of the tape convolutions to apply a compressive force to inner layers of the convolutions. Therefore, the compressive pressure per unit area applied to the tape convolutions in the area of the projections is substantially greater than the pressure per unit area at the hub space portions.

In aircraft arresting apparatus of the type including a reel upon which a flat elongated tape is coiled, the layers of tape on the reel are subjected to a very high centrifugal force when the reel is rotated during arrestment of an aircraft. With a reel having a circular hub, the centrifugal force acting on the coiled tape is substantially the same around the entire periphery of the hub and tape layers. This centrifugal force may often be greater than the compressive force applied to the tape layers by successive outer layers being wound upon the reel under slight tension. In such an arrangement, a void may be created between the reel hub and the tape convolutions or between the two adjacent tape layers somewhere in the coiled tape. Such a void contributes to easy slippage of adjacent tape layers relative to one another and causes a momentary slackening of tension in the free end of the tape. With the arrangement of the present invention, the centrifugal force acting on the tape convolutions is different around the periphery of the reel hub because the tape convolutions are spaced further from the rotational axis of the reel in the area of the projections than in the area of the hub space portions. This difference in centrifugal force at different areas around the periphery of the reel hub prevents formation of a void completely around the periphery of any adjacent tape convolutions. In addition, a greater centrifugal force acting on the tape convolutions in the area of the projections will simply cause the tape layers in the area of the hub space portions to be compressed more tightly against the reel in the area of the hub space portions. Likewise, a greater centrifugal force acting on the tape convolutions in the area of the hub space portions will simply cause the tape convolutions to be more tightly compressed against the projections. With the arrangement of the present invention, slippage of adjacent tape layers relative to one another on the reel is prevented by increasing the normal force between adjacent tape layers over a portion of the reel circumference so that the frictional resistance against slippage is greatly increased.

It is a principal object of the present invention to provide the reel of an aircraft arresting device with a hub of noncircular cross-sectional shape so that an elongated flat tape coiled upon the reel hub has concentrated compressive force applied to it over a certain portion of the reel circumference in order to eliminate slippage of adjacent tape layers relative to one another on the reel.

It is a further object of the present invention to provide such a reel with a hub having equiangularly spaced projections spanned by hub space portions so that an elongated flat tape coiled upon the hub lies closer to the axis of the reel at the hub space portions than at the projections.

It is another object of the present invention to provide such a reel with a hub which causes a varying centrifugal force to be applied to a tape coiled upon the reel in order to eliminate formation of a void between adjacent tape layers around the periphery of the reel.

It is a further object of the present invention to provide a method of arresting an aircraft in which momentary slackening of a tape and impact loading on an aircraft and on an arresting apparatus are eliminated by preventing relative slippage of adjacent tape layers coiled upon a rotatable reel.

BRIEF DESCRIPTION OF THE DRAWING

The invention may take physical form in certain parts and arrangement of parts, a preferred embodiment of which will be described in detail in this specification and illustrated in the accompanying drawings which form a part hereof.

FIG. 3 is an enlarged side, elevational cross-sectional view of the hub and first tape layers on the reel of FIG. 2 and looking in the direction of arrows 2—2 of FIG. 1;

FIG. 4 is a cross-sectional elevational view taken on line 4—4 of FIG. 2;

FIG. 5 is a diagrammatic illustration of stresses provided to tape layers on the reel of the present invention; and FIG. 6 is a side, elevational cross-sectional view of a modified hub construction for the reel of the present invention.

DESCRIPTION OF THE PREFERRED EMBODIMENT

Figures 1, 2:
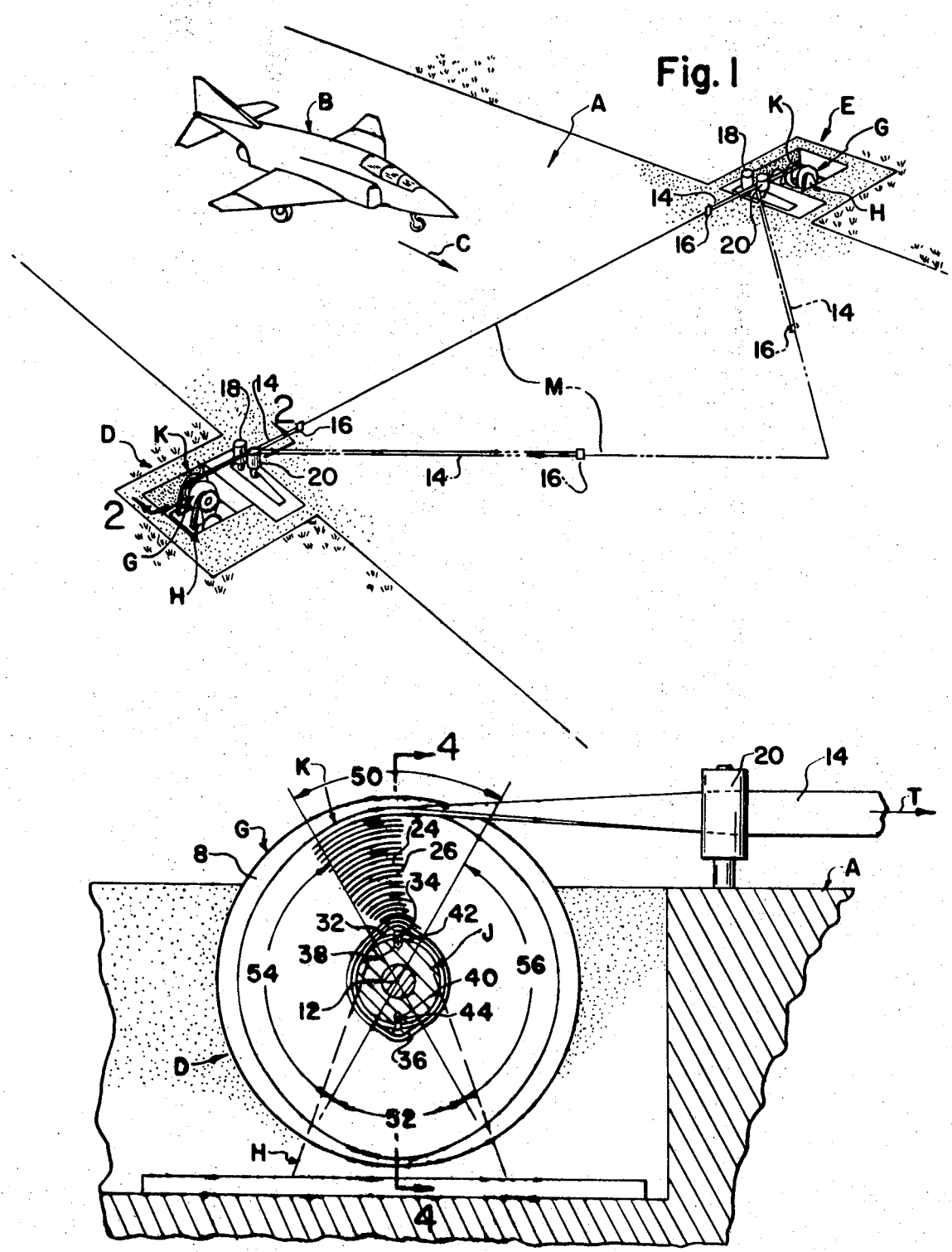
FIG. 1 is a diagrammatic illustration of an aircraft runway having an aircraft arresting apparatus which incorporates the improved reel of the present invention.
FIG. 2 is a side, elevational cross-sectional view of the improved reel of the present invention taken on line 2—2 of FIG. 1.

Referring now to the drawings, wherein the showings are for purposes of illustrating the preferred embodiment of the invention only and not for purposes of limiting same, FIG. 1 shows an aircraft runway or landing strip A for an aircraft B. Aircraft runway A is elongated in the direction of arrow C and a landing aircraft B moves down runway A in the direction of arrow C.

Positioned on opposite sides of runway A are apparatus D and E for arresting movement of a landing aircraft. Each arresting apparatus includes a rotatable reel G rotatably mounted on a fixed support H. Such arrangements are conventional and are described in the aforementioned U.S. Patents to Byrne et al.

As shown in FIG. 2, each reel G includes a central rotational axis 12 and a hub J. An elongated flat tape K is coiled upon hub J of reel G in layer-by-layer convolutions in a manner more fully described in the aforementioned patents to Byrne et al. Sideplates 8 and 10 are secured to hub J, and tape K is positioned between sideplates 8 and 10 as shown in FIG. 4. Each tape K has a free end 14 extending from reel G to points of connection 16 with a steel cable M which is tightly stretched transversely across runway A. Connections at 16 between free ends 14 of tapes K and cable M may be provided in a manner described in U.S. Pat. Nos. 3,263,289; 3,264,017; or 3,333,310 to LaGarde.

Free ends 14 of tape K extend through vertical sheaves 18 and 20 positioned adjacent the edges of runway A when an aircraft B engages cable M and moves it to the dashed line position shown in FIG. 1 sheaves 18 and 20 ensure that tape K will be uncoiled from reels G in an efficient manner. Although reels G are shown rotatably mounted on substantially horizontal axis, it should be recognized that the present invention is equally applicable with reels mounted on substantially vertical rotational axis or some other slanted rotational axis.

Reel G is preferably provided with a braking means to retard rotation of reel G in a manner such as described in the aforementioned U.S. Pat. No. 3,142,458 to Byrne et al. When a landing aircraft engages cable M, cable M and free ends 14 of tapes K continuously move to a dotted line position such as shown in FIG. 1. At the same time, reels G begin rotating and tapes K are uncoiled therefrom so that free ends 14 can move down runway A with cable M and aircraft B. When reels G begin rotating, a braking force is applied to reels G to retard their rotation. This produces a tension T in free ends 14 of tapes K and aircraft B is braked to a stop by the braking force applied to reels G. Tension T is transmitted through all of the layers of tape K coiled upon reel G. This tension produces compression in the layers of tape coiled upon reel G and the only force resisting slippage of two adjacent layers of tape such as 24 and 26, is a frictional force having a magnitude which is substantially equal to the normal force between layers 24 and 26 defined by the aforementioned compressive force multiplied by the coefficient of surface friction of layers 24 and 26. As long as this resisting force against slippage between adjacent layers 24 and 26 is greater than the braking force applied to reel G, there should be no slippage between adjacent layers. However, when the braking force applied to reel G exceeds the force resisting slippage between adjacent layers 24 and 26, slippage will occur to cause a momentary slackening in free ends 14 of tapes K and a considerable reduction in tension T. Once slippage is completed, the full braking force on reel G will again be applied to aircraft B through free ends 14 of tape K. This causes aircraft B, cable M, tapes K and arresting apparatus D and E to be subjected to a highly destructive impact load.

In order to eliminate such impact loads by eliminating slippage between adjacent tape layers 24 and 26, hub J is provided with a noncircular cross-sectional shape. More specifically, initial tape wrap or convolution 32 may be secured to a circular portion of hub J by transverse bars 34 and 36 which extend parallel to central axis 12 of reel G. Bars 34 and 36 may be secured in clamping position upon initial tape convolution 32 as by bolts or screws 38 and 40 passing through suitable holes in bars 34 and 36 and threaded into suitable threaded bores 42 and 44 in the circular portion of hub J. For all successive convolutions of tape K bars 34 and 36 provide hub J with a noncircular cross-sectional shape. Therefore, bars 34 and 36 define projections on hub J extending radially of central axis 12 of reel G. In the preferred arrangement, projections 34 and 36 are equiangularly spaced around the periphery of hub J and are plural in number so that reel G is balanced. It will be obvious that more than two projections may be provided if so desired. In a preferred arrangement, projections 34 and 36 provide a concentration of compressive force extending over arcuate portions 50 and 52 of the tape layers coiled upon reel G. Those arcuate portions of hub J connecting projections 34 and 36 may be defined as hub space portions 54 and 56. It will be noted that arcuate portions 50 and 52 defined by projections 34 and 36 are substantially smaller than hub space portions 54 and 56. In a preferred arrangement, arcuate portions 50 and 52 define substantially less than one-half of the periphery of hub J and in a preferred arrangement they define around one-third of the periphery of hub J. That is, arcuate portions 50 and 52 defined by projections 34 and 36 may occupy around 120° of the periphery of reel G while hub space portions 54 and 56 define around 240°. With this arrangement, arcuate portions 50 and 52 define areas of concentrated compressive force between adjacent tape layers. This may be demonstrated by reference to FIG. 5 in which hub J has substantially the shape of an ellipse with narrow ends 60 and 62 corresponding with projections 34 and 36, and with wider portions 64 and 66 corresponding with hub space portions 54 and 56. Hub J may have a dimension W across hub space portions 64 and 66, and a dimension 2W across projections 60 and 62. When a tape is coiled around hub J under tension it will be evident that that portion of the tape lying against hub space portion 66 is under a tension indicated by arrows 70 which produces compressive force against projection 60. This compressive force produced against projection 60 is concentrated at its midpoint where it is substantially normal to projection 60 an decreases as it spreads further out from the center of projection 60 as shown by the arrows. On the other hand, that portion of the tape lying against projection 62 and being under a tension as indicated by arrows 72 produces a compressive force against hub space portion 64 which is much more uniform and spread out over a wider area than the compressive force against projection 60. This concentration of a higher compressive force per unit area of tape convolution prevents formation of a void between adjacent tape layers which may cause slippage.

Coiled tape K on reel G is subjected to a very high centrifugal force as tape K is uncoiled from reel G during arrestment of an aircraft. In a reel having a substantially circular hub, the coiled tape is subjected to a substantially uniform centrifugal force around its entire periphery. This substantially uniform centrifugal force tends to separate the entire tape coil from the hub and also tends to separate a certain number of outer convolution layers from an inner number of convolution layers. In a reel having a circular hub, this centrifugal force tends to overcome the compressive force existing in the tape layers and create a void. This reduction in normal force acting between tape layers further reduces the resisting force against slippage between layers and slippage occurs much more readily. In the present arrangement, arcuate portions 50 and 52, as defined by projections 34 and 36, are spaced outwardly of rotational axis 12 further then hub spaced portions 54 and 56. This causes the tape convolutions in sectors 50 and 52 to be subjected to a higher centrifugal force than the tape layers in sectors 54 and 56. As is well known, the centrifugal force acting on the tape layers in a sector 50 is defined by the equation $Mrw^2$ where M is the mass of the tape layers in sector 50, $r$ is the distance from axis 12 to the center of mass of the tape layers in sector 52 and $w^2$ is the square of the angular velocity of reel G in radians per second. In the preferred arrangement, the mass of tape layers in a sector 54 is substantially greater then the mass of the layers in sector 50 and in the arrangement shown the mass of the layers in sector 54 is approximately double the mass of layers in a sector 50. In addition, the radius from axis 12 to the center of mass of layers in sector 50 is only slightly greater than the radius from axis 12 to the center of mass of the layers in a sector 54. Therefore, the centrifugal force acting on the layers in a sector 54 is substantially greater than the centrifugal force acting on the layers in a sector 50 and this further increases the compressive force acting on the tape layers in a sector 50 against projection 34. This unbalance of centrifugal force prevents formation of a void around the entire periphery of two adjacent tape layers and substantially eliminates any slippage between adjacent layers. In the preferred arrangement, sectors 50 and 52 are arranged in relation to sectors 54 and 56 so that there is always an unbalanced centrifugal force produced on respective layers in sectors 50 and 52 from that centrifugal force acting on sectors 54 and 56. In a most preferred arrangement, the unbalance of centrifugal force produces a compressive force on the tape layers in sectors 50 and 52 which is substantially proportional to the angular velocity of reel G. This is accomplished by the larger masses of sectors 54 and 56 pulling the layers of tape in sectors 50 and 52 into tighter engagement with projections 34 and 36 as the rotational velocity of reel G increases.

Instead of using members 34 and 36 to secure the initial convolution of tape K to hub J it will be understood that a substantially elliptical hub may be formed as shown at P in FIG. 6 by forming an outer metal sheet 80 into an elliptical shape around frame members 82—90 connected with a rotational axis 92. In such an arrangement, tape K may have a lug 94 formed on its end in the manner of the aforementioned LaGarde patents for connection internally of hub P.

Other arrangements for preventing slippage between adjacent tape layers on a reel are described in two copending patent applications of Charles S. Thompson, Jr. entitled "Aircraft Arresting Device," Ser. No. 839,878 and 839,989 filed on July 8, 1969. The disclosures of these applications are hereby incorporated by reference into this application.

While the invention has been described with reference to a preferred embodiment, it will be obvious that modifications and alterations will occur to others upon the reading and understanding of this specification.

I claim:

1. An aircraft arresting device including a rotatable reel having a central axis and hub means on which an elongated flat tape is coiled in layer-by-layer convolutions, said hub means having a noncircular cross-sectional shape and including a plurality of substantially equiangularly spaced projections extending radially of said axis, said hub means having hub space portions between adjacent ones of said plurality of projections, said hub means having an outer periphery defined by said projections and said hub space portions, said hub space portions defining a substantially greater portion of said outer periphery than said projections, said tape convolutions lying closer to said axis at said hub space portions than at said projections, said tape being under tension on said reel and successive outer layers of said convolutions applying compressive force to inner layers of said convolutions, said compressive force applying a substantially greater pressure per unit area to said tape convolutions at said projections than at said hub space portions.

2. The device of claim 1 wherein said hub means has a substantially elliptical cross-sectional shape.

3. The device of claim 1 wherein said compressive force applying a substantially greater pressure per unit area at said projections is substantially proportional to the angular velocity of said reel when said reel rotates and said tape uncoils therefrom during arrestment of an aircraft.

4. The device of claim 1 wherein said compressive force applying a substantially greater pressure per unit area at said projections is produced by a centrifugal force acting on said tape at said hub space portions which is substantially greater than the centrifugal force acting on said tape at said projections.

5. A reel for an aircraft arresting device, said reel having a central axis and hub means on which an elongated flat tape is adapted to be coiled in layer-by-layer convolutions, said hub means having a noncircular cross-sectional shape and including a plurality of substantially equiangularly spaced projections extending radially of said axis, said hub means having hub space portions between adjacent ones of said plurality of projections, said hub means having an outer periphery defined by said projections and said hub space portions, said hub space portions defining a substantially greater portion of said outer periphery than said projections, and the periphery of said hub space portions lying closer to said axis than the periphery of said projections.

6. The reel of claim 5 wherein said hub means has a substantially elliptical cross-sectional shape.

7. A method of arresting an aircraft comprising the steps of engaging an aircraft with engagement means connected with the free end of a flat elongated tape extending from a rotatable reel on which the tape is stored in layer-by-layer convolutions, placing the free end of the tape in tension to uncoil the tape from the reel, and preventing relative slippage of adjacent tape layers on the reel during aircraft arrestment by storing said tape on a reel having a hub of noncircular cross-sectional shape to provide a plurality of arcuate portions of the coiled tape with a compressive pressure per unit area substantially greater than the compressive pressure developed per unit area on a reel having a hub of circular cross-sectional shape.